United States Patent
Li

(10) Patent No.: US 10,691,265 B2
(45) Date of Patent: Jun. 23, 2020

(54) GESTURE DETECTION

(71) Applicant: AT&T Intellectual Property I, L.P., Atlanta, GA (US)

(72) Inventor: Kevin Li, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/729,025

(22) Filed: Oct. 10, 2017

(65) Prior Publication Data

US 2018/0067577 A1    Mar. 8, 2018

Related U.S. Application Data

(63) Continuation of application No. 14/070,493, filed on Nov. 2, 2013, now Pat. No. 9,817,521.

(51) Int. Cl.
   *G06F 3/043* (2006.01)
   *G06F 3/0488* (2013.01)

(52) U.S. Cl.
   CPC ............ *G06F 3/043* (2013.01); *G06F 3/0488* (2013.01); *G06F 2200/1636* (2013.01)

(58) Field of Classification Search
   CPC ..................................................... G06F 3/043
   See application file for complete search history.

(56) References Cited

U.S. PATENT DOCUMENTS

| | | | |
|---|---|---|---|
| 5,977,957 A | 11/1999 | Miller et al. | |
| 6,456,487 B1 | 9/2002 | Hetterick | |
| 7,138,727 B2 | 11/2006 | Hein et al. | |
| 7,193,617 B1 | 3/2007 | Kanbara et al. | |
| 7,489,303 B1 | 2/2009 | Pryor | |
| 7,683,890 B2 | 3/2010 | Geaghan | |
| 7,920,102 B2 | 4/2011 | Breed | |
| 7,999,660 B2 | 8/2011 | Cybart et al. | |
| 8,130,202 B2 | 3/2012 | Levine et al. | |
| 8,358,286 B2 | 1/2013 | Cannon | |
| 8,396,252 B2 | 3/2013 | Dokor | |
| 8,405,618 B2 | 3/2013 | Colgate | |
| 8,482,535 B2 | 7/2013 | Pryor | |
| 8,493,354 B1 | 7/2013 | Birnbaum et al. | |
| 8,787,009 B2 | 7/2014 | Wilson et al. | |
| 8,797,295 B2 | 8/2014 | Bernstein et al. | |
| 9,007,758 B2 | 4/2015 | Wilson et al. | |
| 9,595,659 B2 | 3/2017 | Kim | |
| 2003/0109972 A1 | 6/2003 | Tak | |

(Continued)

FOREIGN PATENT DOCUMENTS

JP    2011220894 A    4/2011

OTHER PUBLICATIONS

Sebatian Anthony, "Piezoelectrics Bring Tactile, Haptic Feedback to Touchscreens", Extreme Tech, Nov. 16, 2011, 2 pages.

(Continued)

*Primary Examiner* — Kent W Chang
*Assistant Examiner* — Scott Au
(74) *Attorney, Agent, or Firm* — Chiesa Shahinian & Giantomasi PC

(57) ABSTRACT

A supplemental surface area allows gesture recognition on outer surfaces of mobile devices. Inputs may be made without visual observance of display devices. Gesture control on outer surfaces permits socially acceptable, inconspicuous interactions without overt manipulation.

15 Claims, 22 Drawing Sheets

(56) References Cited

U.S. PATENT DOCUMENTS

| | | |
|---|---|---|
| 2003/0122779 A1 | 7/2003 | Martin et al. |
| 2004/0263489 A1 | 12/2004 | Wallenius |
| 2009/0273583 A1 | 11/2009 | Norhammar |
| 2010/0141410 A1 | 6/2010 | Aono et al. |
| 2010/0328053 A1 | 12/2010 | Yeh et al. |
| 2011/0080350 A1* | 4/2011 | Almalki ............... G06F 3/0414 345/173 |
| 2011/0102341 A1 | 5/2011 | Imai et al. |
| 2012/0052929 A1* | 3/2012 | Thammasouk ....... G06F 1/1626 455/575.1 |
| 2012/0062491 A1 | 3/2012 | Coni et al. |
| 2012/0068956 A1 | 3/2012 | Jira et al. |
| 2012/0081337 A1 | 4/2012 | Camp et al. |
| 2012/0154316 A1 | 6/2012 | Kono |
| 2012/0188200 A1 | 7/2012 | Roziere |
| 2012/0194483 A1 | 8/2012 | Deluca |
| 2012/0229407 A1 | 9/2012 | Harris et al. |
| 2012/0262403 A1 | 10/2012 | Tissot |
| 2012/0286847 A1 | 11/2012 | Peshkin et al. |
| 2013/0044073 A1 | 2/2013 | Christiansson et al. |
| 2013/0063336 A1 | 3/2013 | Sugimoto et al. |
| 2013/0090807 A1 | 4/2013 | Kojima et al. |
| 2013/0120257 A1 | 5/2013 | Park et al. |
| 2013/0120262 A1 | 5/2013 | Piot et al. |
| 2013/0151031 A1 | 6/2013 | Ricci |
| 2013/0156296 A1 | 6/2013 | El Dokor |
| 2013/0187889 A1 | 7/2013 | Pandher et al. |
| 2013/0191741 A1 | 7/2013 | Dickinson et al. |
| 2013/0204457 A1 | 8/2013 | King et al. |
| 2014/0050354 A1 | 2/2014 | Heim et al. |
| 2014/0160027 A1 | 6/2014 | Bateman et al. |
| 2014/0267175 A1 | 9/2014 | Hecht et al. |
| 2014/0339130 A1 | 11/2014 | Manning et al. |
| 2015/0094083 A1 | 4/2015 | Ngo |
| 2016/0054853 A1 | 2/2016 | Hu et al. |

OTHER PUBLICATIONS

Bonnie Cha, "Motorola Backflip—Platinum Silver (AT&T) Review", CNET, Mar. 2, 2010, 5 pages.

"Integrating Gesture Control Inside the Car," Publitek European Editors, Aug. 2, 2012, 5 pages.

A. Renier,"Gestrual Interaction in Vehicular Applications", Apr. 2012, 6 pages.

Travis Deyle, et al., "Hambone: A Bio-Acoustic Gesture Interface", 2007, 8 pages.

Bruce Banter, "Touch Screens and Touch Surfaces are Enriched by Haptic Force-Feedback", Enabling Technology, Information Display, Mar. 2010, 5 pages.

Oscar Camacho, et al., "Designing Touch Sensing Electrodes", by Freescale Semiconductor published on Jul. 2011, downloaded from https://cache.freescale.com/files/sensors/doc/app_note/AN3863.pdf, 2 pages.

Non-Final Office Action dated Aug. 29, 2019, in connection with U.S. Appl. No. 16/010,855; 12 pgs.

\* cited by examiner

GESTURE DETECTION

This application is a continuation of prior U.S. patent application Ser. No. 14/070,493, filed Nov. 2, 2013, which is herein incorporated by reference in its entirety.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Touch sensors are common in electronic displays. Many mobile smartphones and tablet computers, for example, have a touch screen for making inputs. A user's finger touches a display, and a touch sensor detects the input.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
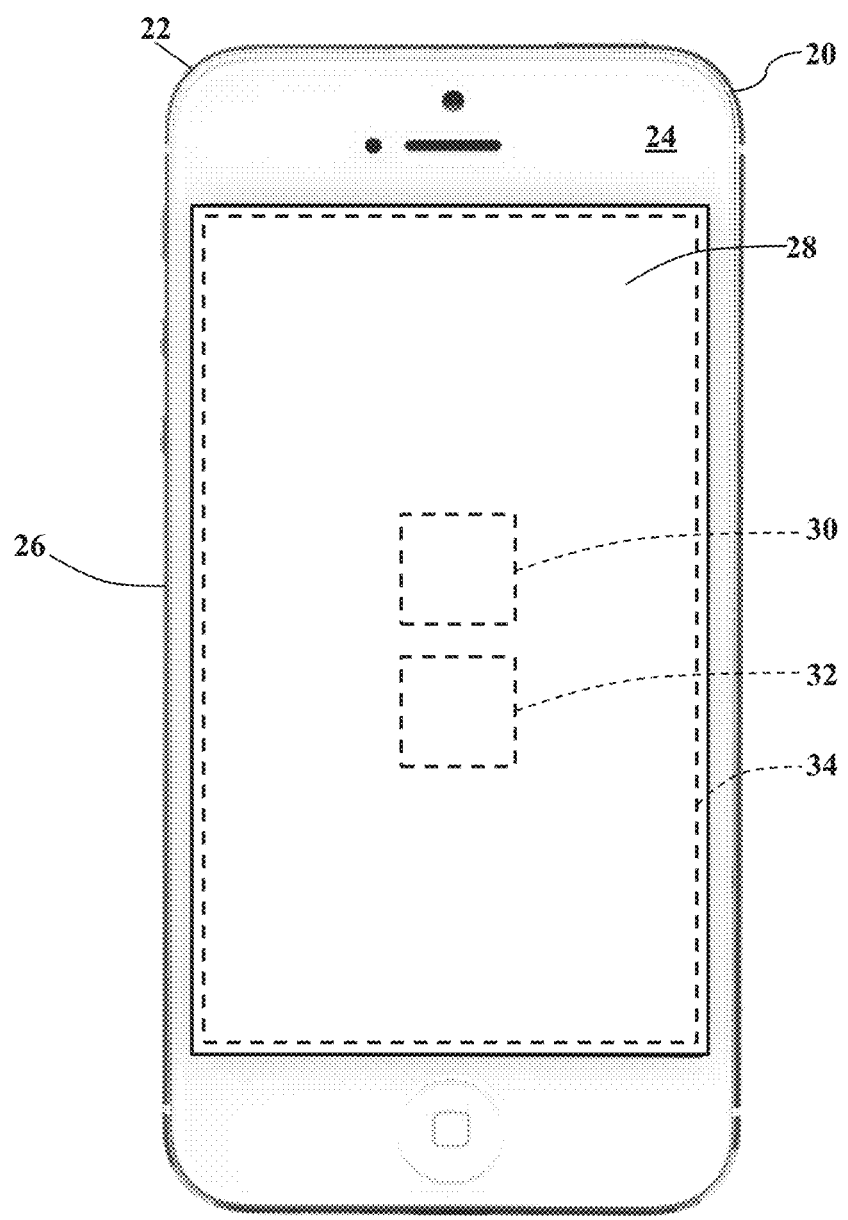
FIGS. 1 and 2 are simplified schematics illustrating an environment in which exemplary embodiments may be implemented.
Figure 2:
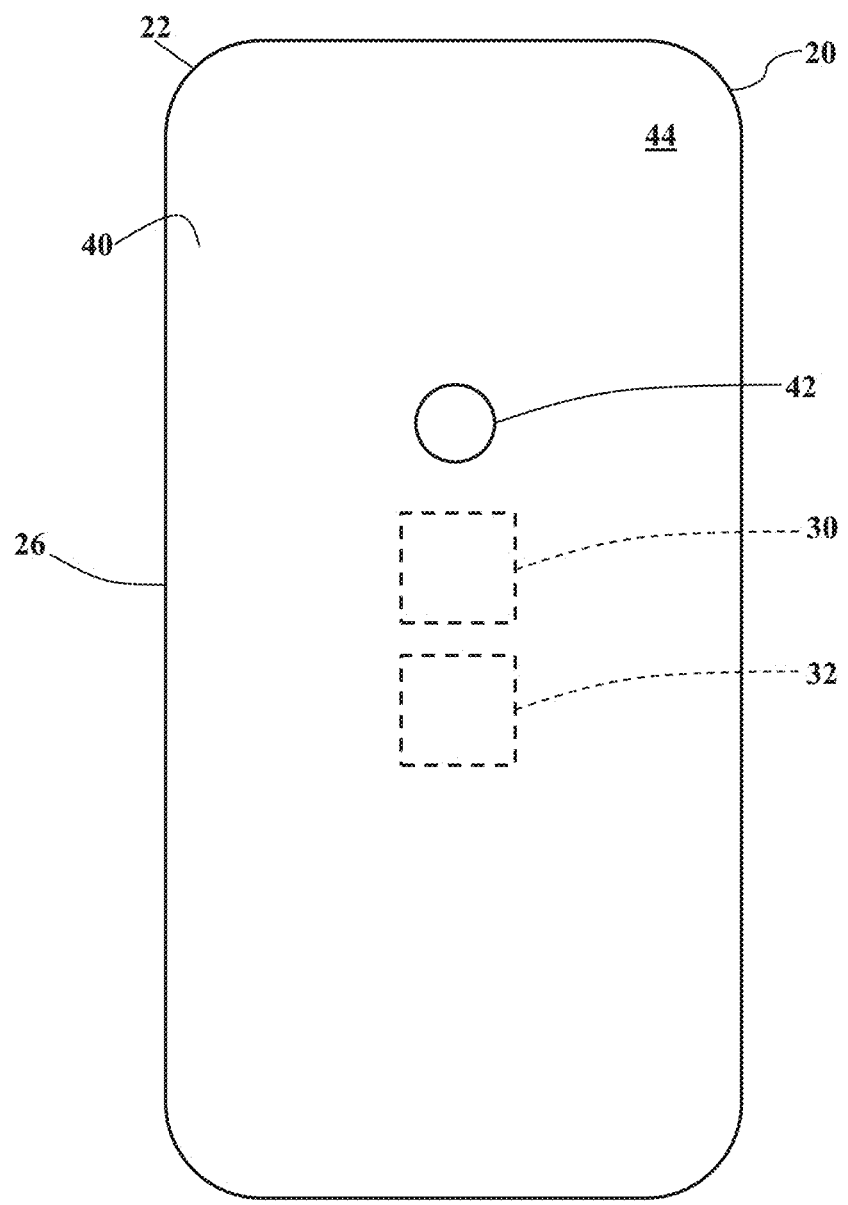

FIGS. 1 and 2 are simplified schematics illustrating an environment in which exemplary embodiments may be implemented. FIGS. 1 and 2 illustrate an electronic device 20 that accepts touches, swipes, and other physical gestures as inputs. The electronic device 20, for simplicity, is illustrated as a mobile smartphone 22, but the electronic device 20 may be any processor-controlled device (as later paragraphs will explain). Regardless, FIG. 1 illustrates a front side 24 of the electronic device 20, with body 26 housing the components within the electronic device 20. A display device 28, for example, displays icons, messages, and other content to a user of the electronic device 20. The display device 28 interfaces with a processor 30. The processor 30 executes instructions that are stored in a memory 32. The electronic device 20 may also include a touch sensor 34. The touch sensor 34 is conventionally installed on or above a front face of the display device 28. The touch sensor 34 detects the user's physical inputs above the display device 28. The display device 28 generates visual output in response to instructions from the processor 30, and the touch sensor 34 generates an output in response to the user's physical inputs, as is known.

FIG. 2 illustrates a backside 40 of the electronic device 20. Here the body 26 includes a gesture detector 42. The gesture detector 42 detects physical gestures that are made on an outer surface 44 of the body 26. The user may make gestures on the outer surface 44 of the body 26, and the processor 30 interprets those gestures to control the electronic device 20. The user's fingers, for example, may contact the body 26 and make a swiping motion on the outer surface 44. The processor 30 interprets the swiping motion to execute some command, such as transitioning to a different display screen, answering a call, capturing a photo, or any other action. The user may also tap the outer surface 44 of the body 26 to select icons, web pages, or other options displayed on the display device (illustrated as reference numeral 28 in FIG. 1). Indeed, the user may associate any gesture to any action, as later paragraphs will explain.

Exemplary embodiments thus greatly increase input area. Conventional electronic devices limit gesture detection to the display device 28 (i.e., the touch sensor 34 above the display device 28, as FIG. 1 illustrated). Exemplary embodiments, instead, recognize inputs over any portion of the body 26. The user's fingers may draw shapes across the body 26 of the electronic device 20, and those shapes may be recognized and executed. Exemplary embodiments thus permit inputs without having to visually observe the display device 28. The user may make gesture inputs without observing the display device 28 and, indeed, without holding the electronic device 20 in the hand. For example, when the smartphone 22 is carried in a pocket, the user may still make gesture inputs, without removing the smartphone 22. The gesture detector 42 recognizes simple taps and swipes, more complex geometric shapes, and even alphanumeric characters. Because the electronic device 20 need not be held, exemplary embodiments permit socially acceptable interactions in situations without overtly holding and manipulating the display device 28. Exemplary embodiments thus permit inconspicuous interaction in a variety of environments, using the entire body 26 as an input surface.

Figure 3:
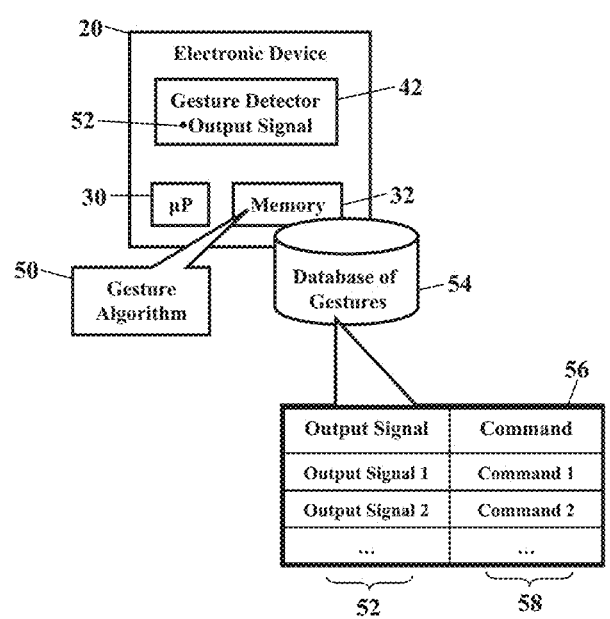
FIG. 3 is a more detailed block diagram illustrating the operating environment, according to exemplary embodiments.

FIG. 3 is a more detailed block diagram illustrating the operating environment, according to exemplary embodiments. FIG. 3 illustrates the electronic device 20, the processor 30, and the memory 32. The processor 30 may be a microprocessor ("μP"), application specific integrated circuit (ASIC), or other component that executes a gesture algorithm 50 stored in the memory 32. The gesture algorithm 50 includes instructions, code, and/or programs that cause the processor 30 to interpret any gesture input sensed by the gesture detector 42. When the user draws and/or taps a gesture on the outer surface of the body (illustrated, respectively, as reference numerals 44 and 26 in FIGS. 1-2), the gesture detector 42 generates an output signal 52. The processor 30 receives the output signal 52 and queries a database 54 of gestures. FIG. 3 illustrates the database 54 of gestures as a table 56 that is locally stored in the memory 32 of the electronic device 20. The database 54 of gestures, however, may be remotely stored and queried from any location in a communications network. Regardless, the database 54 of gestures maps, associates, or relates different output signals 52 to their corresponding commands 58. The processor 30 compares the output signal 52 to the entries stored in the database 54 of gestures. Should a match be found, the processor 30 retrieves the corresponding command 58. The processor 30 then executes the command 58 in response to the output signal 52, which is generated by the gesture detector 42 in response to the user's gesture input.

Figure 4:
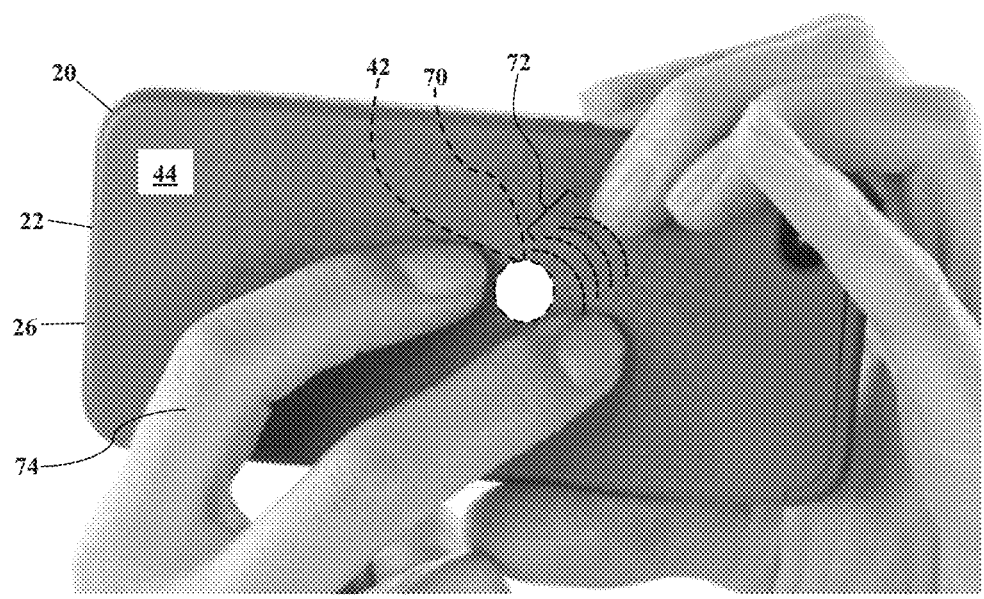
FIGS. 4-5 are schematics illustrating a gesture detector, according to exemplary embodiments.

FIG. 4 is another schematic illustrating the gesture detector 42, according to exemplary embodiments. While the gesture detector 42 may be any device, the gesture detector 42 is preferably a piezoelectric transducer 70. The gesture detector 42 may thus utilize the piezoelectric effect to respond to vibration 72 sensed in, on, or around the body 26. As the user draws and/or taps the gesture 74 on the outer surface 44 of the body 26, vibration waves travel through or along the outer surface 44 of the body 26. The piezoelectric transducer 70 senses the vibration 72. The piezoelectric effect causes piezoelectric transducer 70 to generate the output signal (illustrated as reference numeral 52 in FIG. 3), in response to the vibration 72. Exemplary embodiments then execute the corresponding command (illustrated as reference numeral 58 in FIG. 3), as earlier paragraphs explained.

The gesture detector 42 may even respond to sound waves. As the gesture detector 42 may utilize the piezoelectric effect, the gesture detector 42 may sense the vibration 72 due to both mechanical waves and acoustic waves. As those of ordinary skill in the art understand, the vibration 72 may be generated by sound waves propagating along the body 26 and/or incident on the piezoelectric transducer 70. Sound waves may thus also excite the piezoelectric transducer 70. So, whether the user taps, draws, or even speaks, the gesture detector 42 may respond by generating the output signal 52. Indeed, the piezoelectric transducer 70 may respond to the vibration 72 caused by the user's physical and audible inputs. The gesture detector 42 may thus generate the output signal 52 in response to any mechanical and/or acoustic wave.

Figure 5:
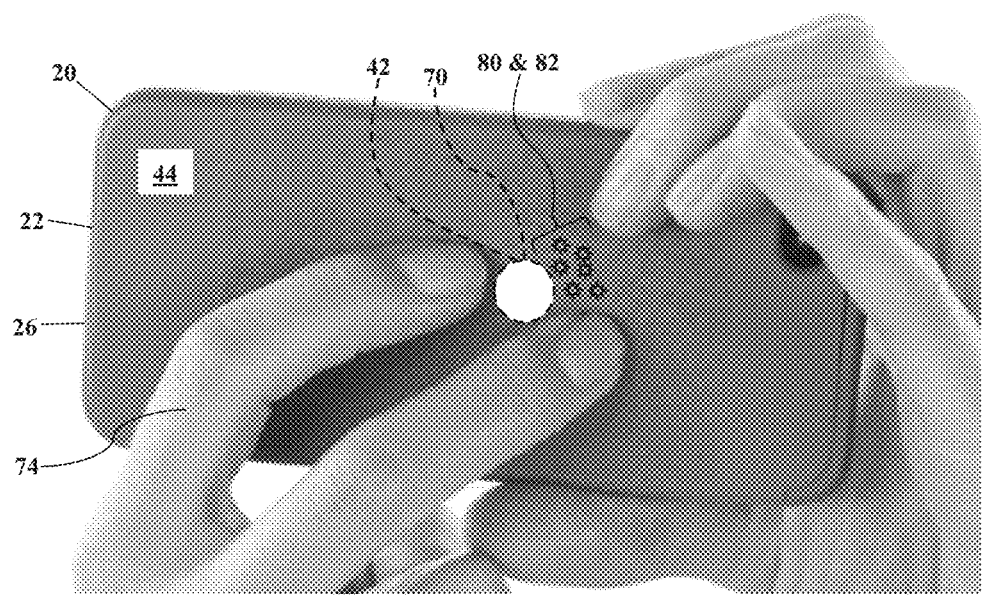

FIG. 5 is another schematic illustrating the gesture detector 42, according to exemplary embodiments. Here the gesture detector 42 may respond to electrical charges 80 on or in the body 26 of the electronic device 20. As the user draws the gesture 74 on surface 44 of the body 26, electrical charges 80 may build on or within the body 26. FIG. 5 grossly enlarges the electrical charges 80 for clarity of illustration. Regardless, the electrical charges 80 may cause an electric field 82, which may also excite the piezoelectric transducer 70. So, the gesture detector 42 may also generate the output signal (illustrated as reference numeral 52 in FIG. 3) in response to the electric field 82. The gesture detector 42 may thus also respond to the electric charges 80 induced on the body 26.

Figure 6:
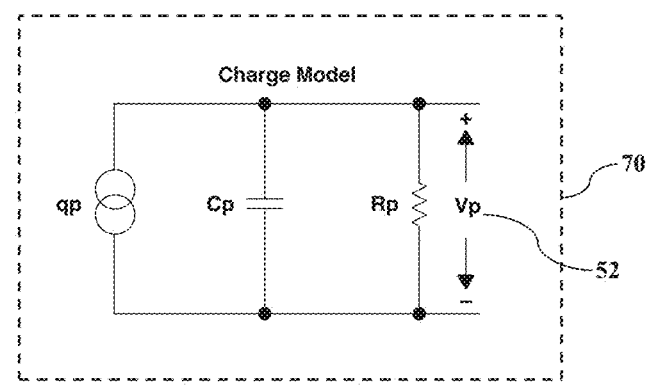
FIGS. 6-7 are circuit schematics illustrating a piezoelectric transducer, according to exemplary embodiments.
Figure 7:
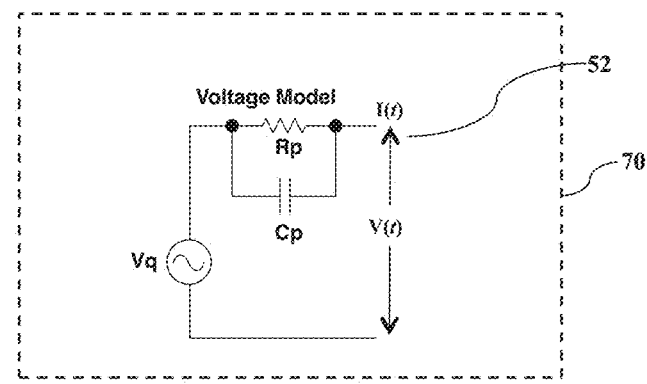

FIGS. 6-7 are modeling circuit schematics illustrating the piezoelectric transducer 70, according to exemplary embodiments. Because the gesture detector 42 may utilize the piezoelectric effect, the gesture detector 42 may sense mechanical waves, acoustic waves, and the electrical charge (illustrated as reference numeral 80 in FIG. 5). The piezoelectric transducer 70 responds by generating the output signal 52. The output signal 52 may be voltage or charge, depending on construction of the piezoelectric transducer 70. FIG. 6, for example, is a circuit schematic illustrating the piezoelectric transducer 70 modeled as a charge source with a shunt capacitor and resistor. FIG. 7 illustrates the piezoelectric transducer 70 modeled as a voltage source with a series capacitor and resistor. The output voltage may vary from microvolts to hundreds of Volts, so some signal conditioning (e.g., analog-to-digital conversion and amplification) may be needed.

Figure 8:
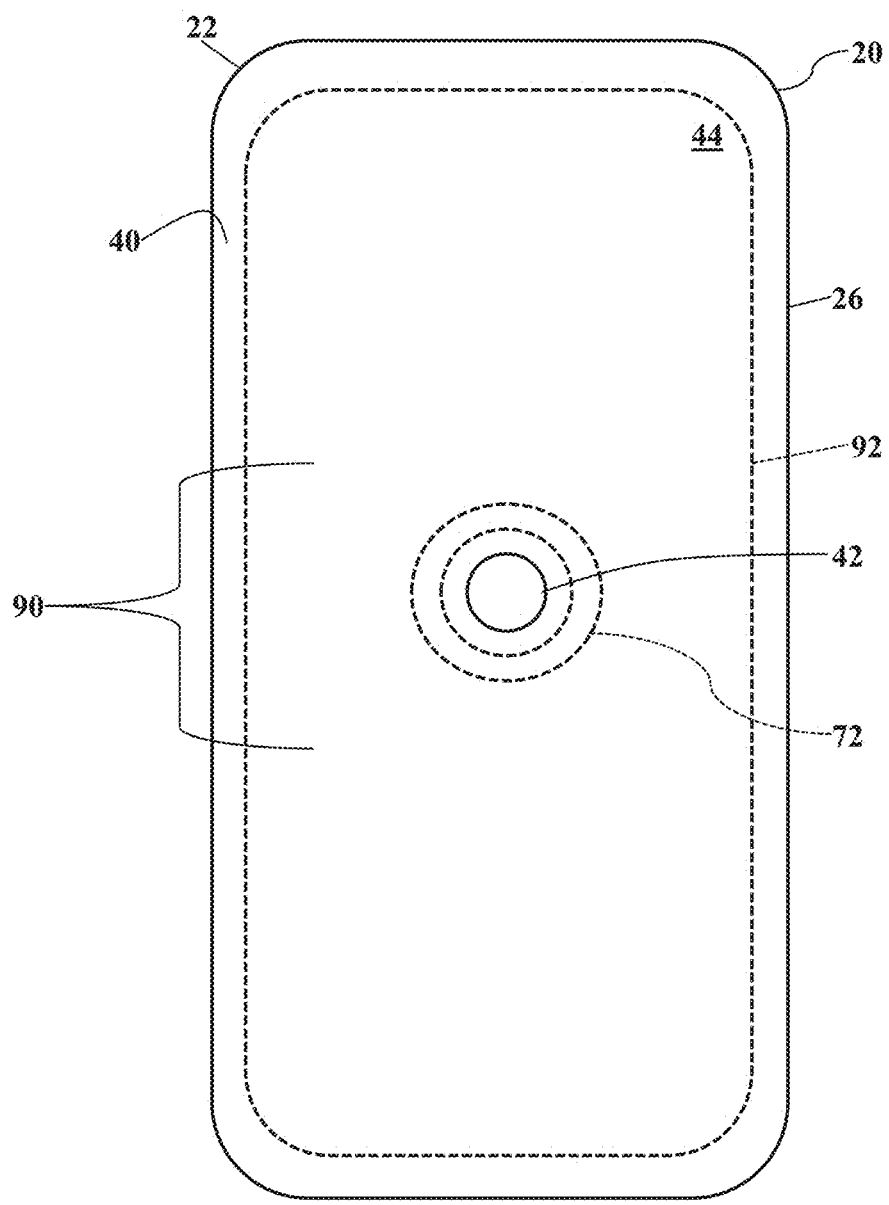
FIGS. 8-11 are more schematics illustrating the gesture detector, according to exemplary embodiments.
Figure 9:
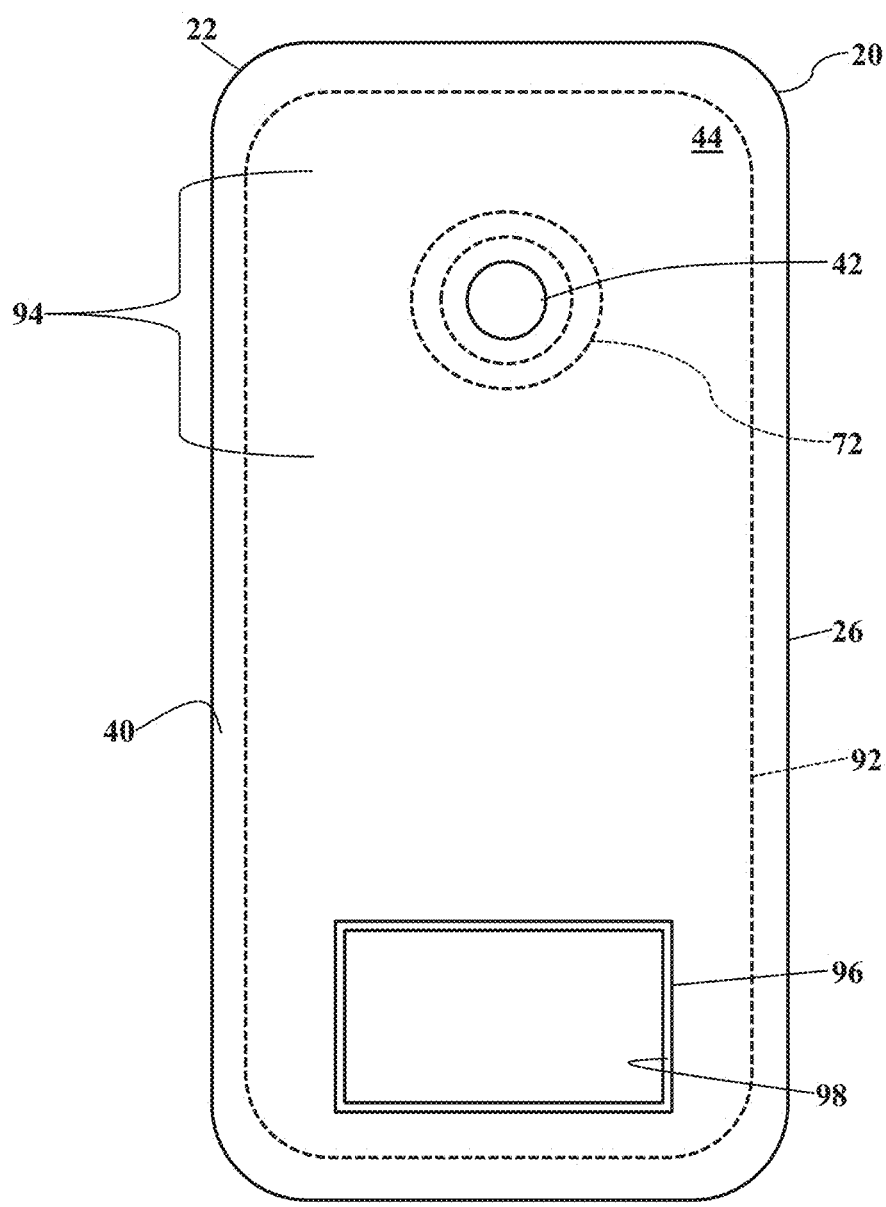

FIGS. 8-11 are more schematics illustrating the gesture detector 42, according to exemplary embodiments. Because the gesture detector 42 responds to physical gestures, the gesture detector 42 may be installed at any position or location on or in the body 26. FIG. 8, for example, illustrates the gesture detector 42 mounted to a central region 90 on the backside 40 of the electronic device 20. As the backside 40 may present a large, supplemental gesture surface area 92 for inputting gestures, the gesture detector 42 may be disposed in or near the central region 90 to detect the vibration 72. FIG. 9, though, illustrates the gesture detector 42 disposed in or near an end region 94 on the backside 40 of the electronic device 20. The end region 94 may be preferred in some situations, such as when the body 26 includes an access door 96 to a battery compartment. A discontinuous gap 98 around the access door 96 may attenuate transmission of waves or conduction of charge, thus reducing or nullifying the output signal 52 produced by the gesture detector 42. A designer may thus prefer to locate the gesture detector 42 in some region of the body 26 that adequately propagates waves or conducts charge.

Figure 10:
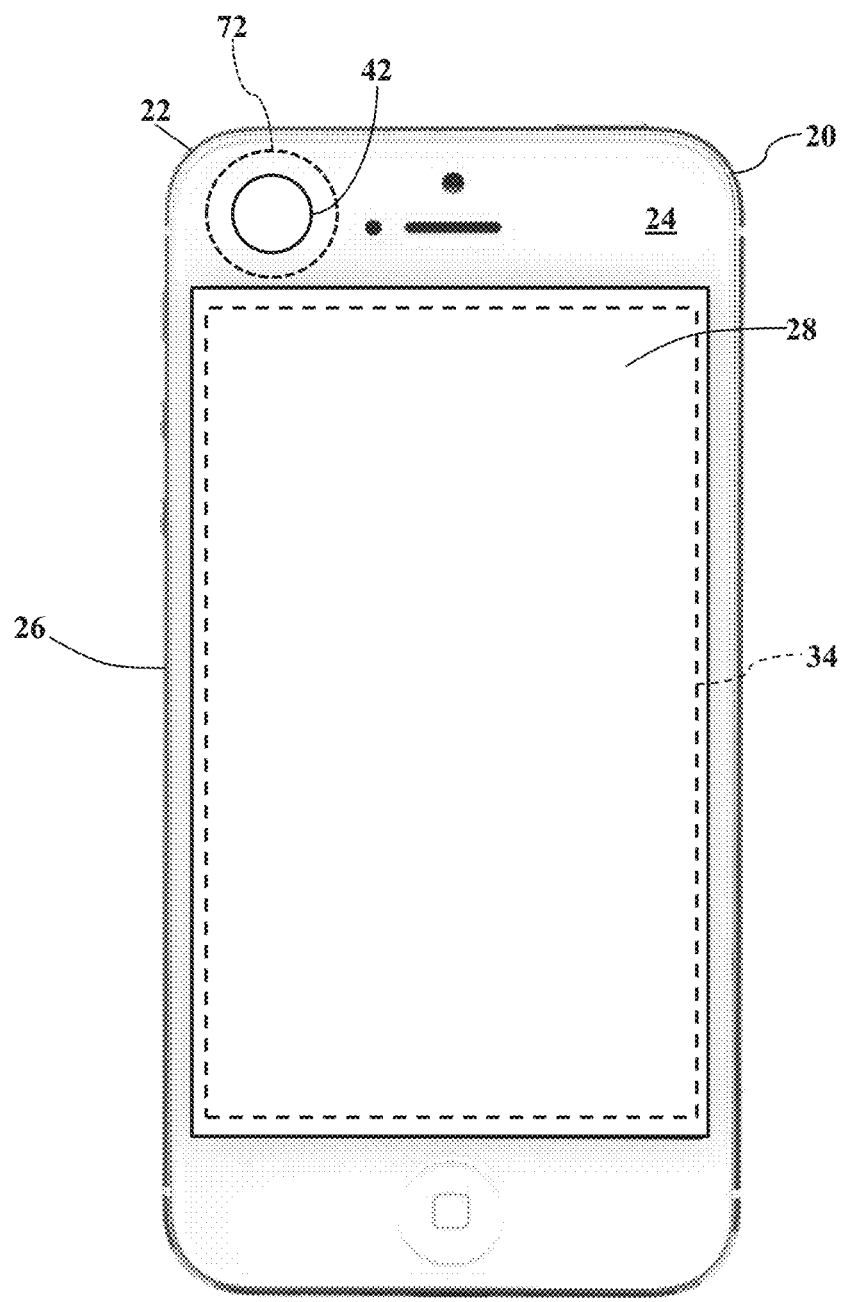
Figure 11:
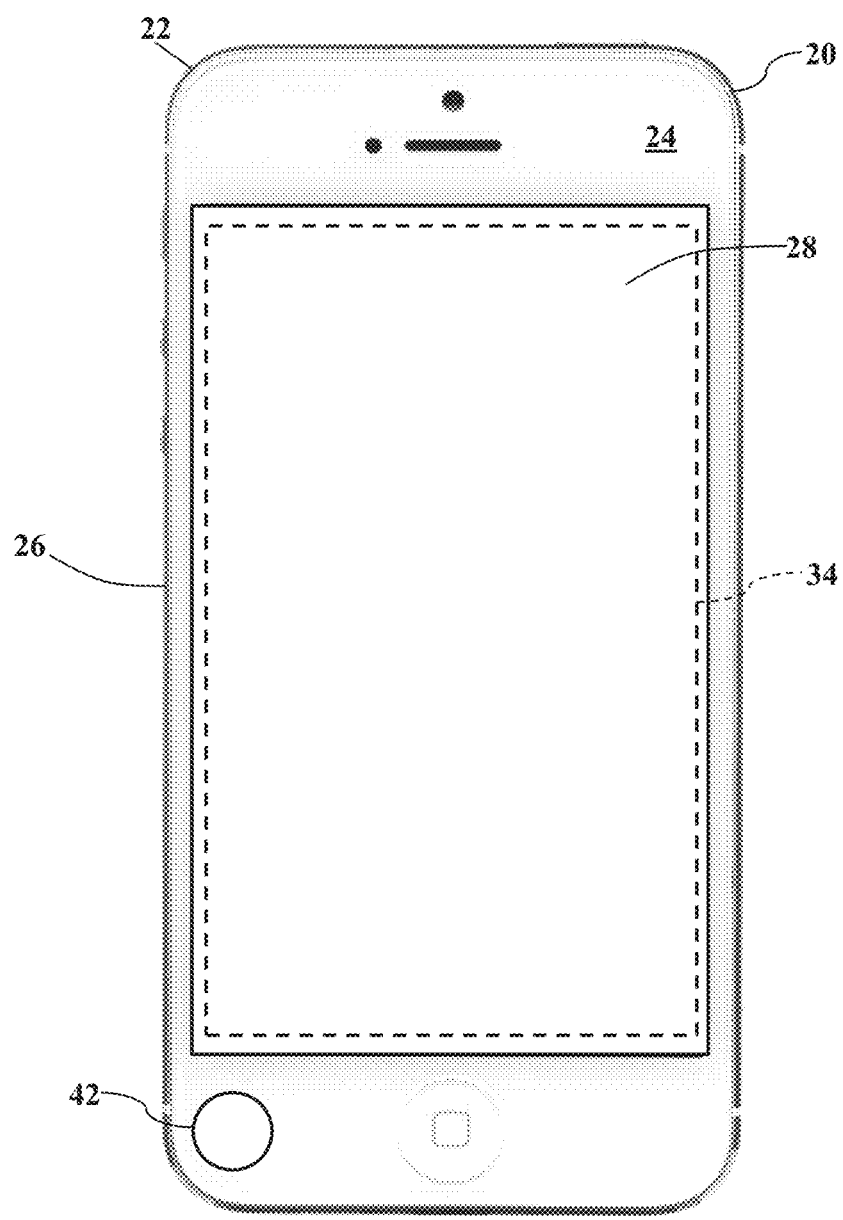

FIGS. 10 and 11 illustrate frontal orientations. FIG. 10 illustrates the gesture detector 42 disposed on or proximate the front side 24 of the electronic device 20. Even though the electronic device 20 may have the conventional touch sensor 34 detecting inputs above the display device 28, any portion of the front side 24 of the body 26 may also be used for gesture inputs. FIG. 11, likewise, illustrates the gesture detector 42 located in a corner region of the body 26. The gesture detector 42 may thus be installed at any location of the body 26 to detect the vibration 72 caused by gesture inputs.

Figure 12:
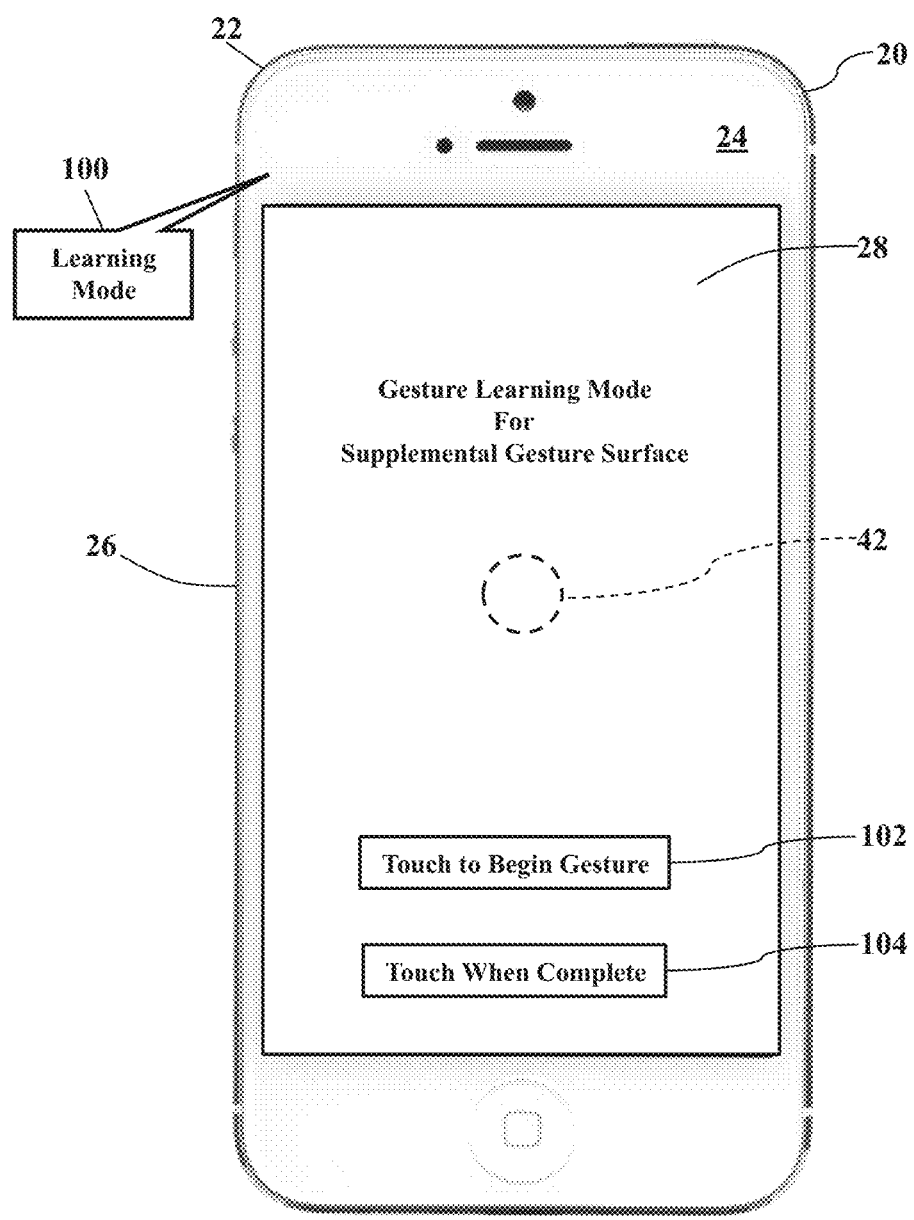
FIGS. 12-14 are schematics illustrating a learning mode of operation, according to exemplary embodiments.
Figure 13:
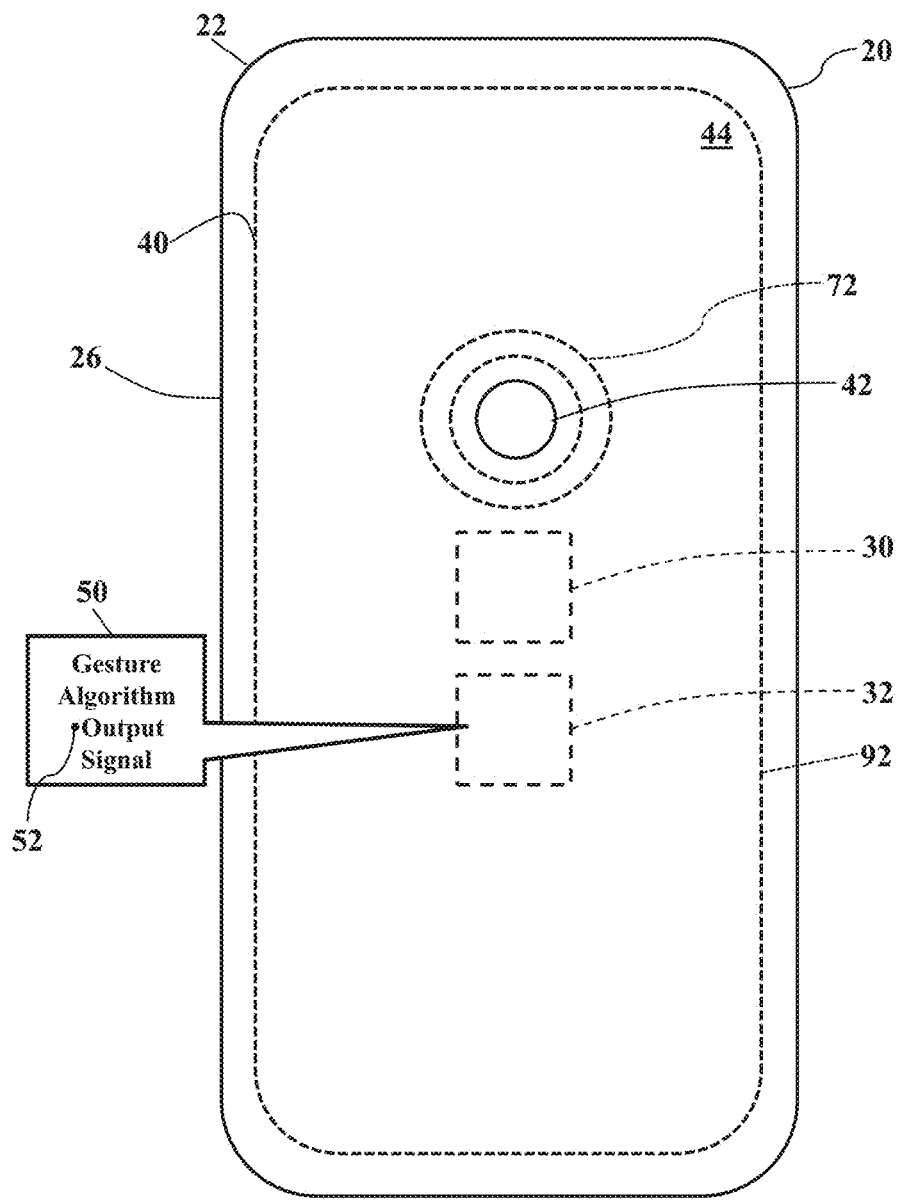
Figure 14:
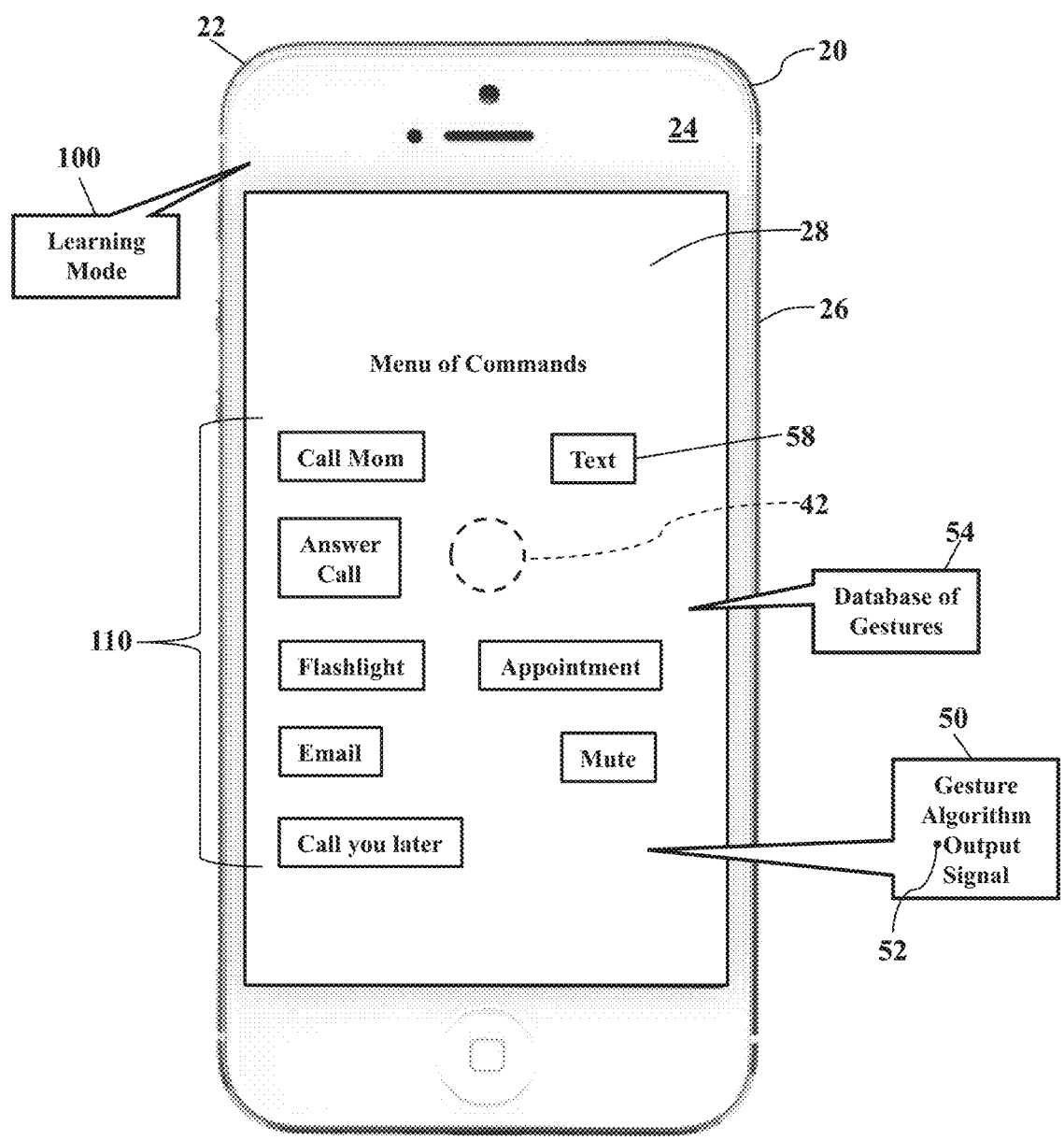

FIGS. 12-14 are schematics illustrating a learning mode 100 of operation, according to exemplary embodiments. Wherever the gesture detector 42 is located, here the user trains the electronic device 20 to recognize particular gestures drawn on the body 26. When the user wishes to store a gesture for later recognition, the user may first put the electronic device 20 into the learning mode 100 of operation. FIG. 12, for example, illustrates a graphical user interface or screen that is displayed during the learning mode 100 of operation. The user may be prompted 102 to draw a gesture somewhere on the body 26, such as the supplemental gesture surface area (illustrated as reference numeral 92 in FIG. 8). After the user inputs the desired gesture, the user may confirm completion 104 of the gesture.

FIG. 13 again illustrates the backside 40 of the electronic device 20. Here the outer surface 44 of the backside 40 of the electronic device 20 is the supplemental gesture surface area 92. The user performs any two-dimensional or even three-dimensional movement. As the gesture is drawn, the vibration 72 propagates through the body 26 as mechanical and/or acoustical waves. The gesture detector 42 senses the vibration 72 and generates the output signal 52. The gesture detector 42 may also sense and respond to the electrical charges (as explained with reference to FIGS. 5-7). The gesture algorithm 50 causes the electronic device 20 to read and store the output signal 52 in the memory 32. Once the gesture is complete, the user selects the completion icon 104, as FIG. 12 illustrates.

FIG. 14 illustrates a menu 110 of the commands 58. The menu 110 is stored and retrieved from the memory (illustrated as reference numeral 32 in FIG. 13). The menu 110 is processed for display by the display device 28. Once the user confirms completion of the gesture, the user may then associate one of the commands 58 to the gesture. The menu 110 thus contains a selection of different commands 58 from which the user may choose. FIG. 14 only illustrates a few popular commands 58, but the menu 110 may be a much fuller listing. The user touches or selects the command 58 that she wishes to associate to the gesture (e.g., the output signal 52). Once the user makes her selection, the processor (illustrated as reference numeral 30 in FIG. 13) adds a new entry to the database 54 of gestures. The database 54 of gestures is thus updated to associate the output signal 52 to the command 58 selected from the menu 110. The user may thus continue drawing different gestures, and associating different commands, to populate the database 54 of gestures.

The database 54 of gestures may also be prepopulated. When the user purchases the electronic device 20, a manufacturer or retailer may preload the database 54 of gestures. Gestures may be predefined to invoke or call commands, functions, or any other action. The user may then learn the predefined gestures, such as by viewing training tutorials. The user may also download entries or updates to the database 54 of gestures. A server, accessible from the Internet, may store predefined associations that are downloaded and stored to the memory 32.

Figure 15:
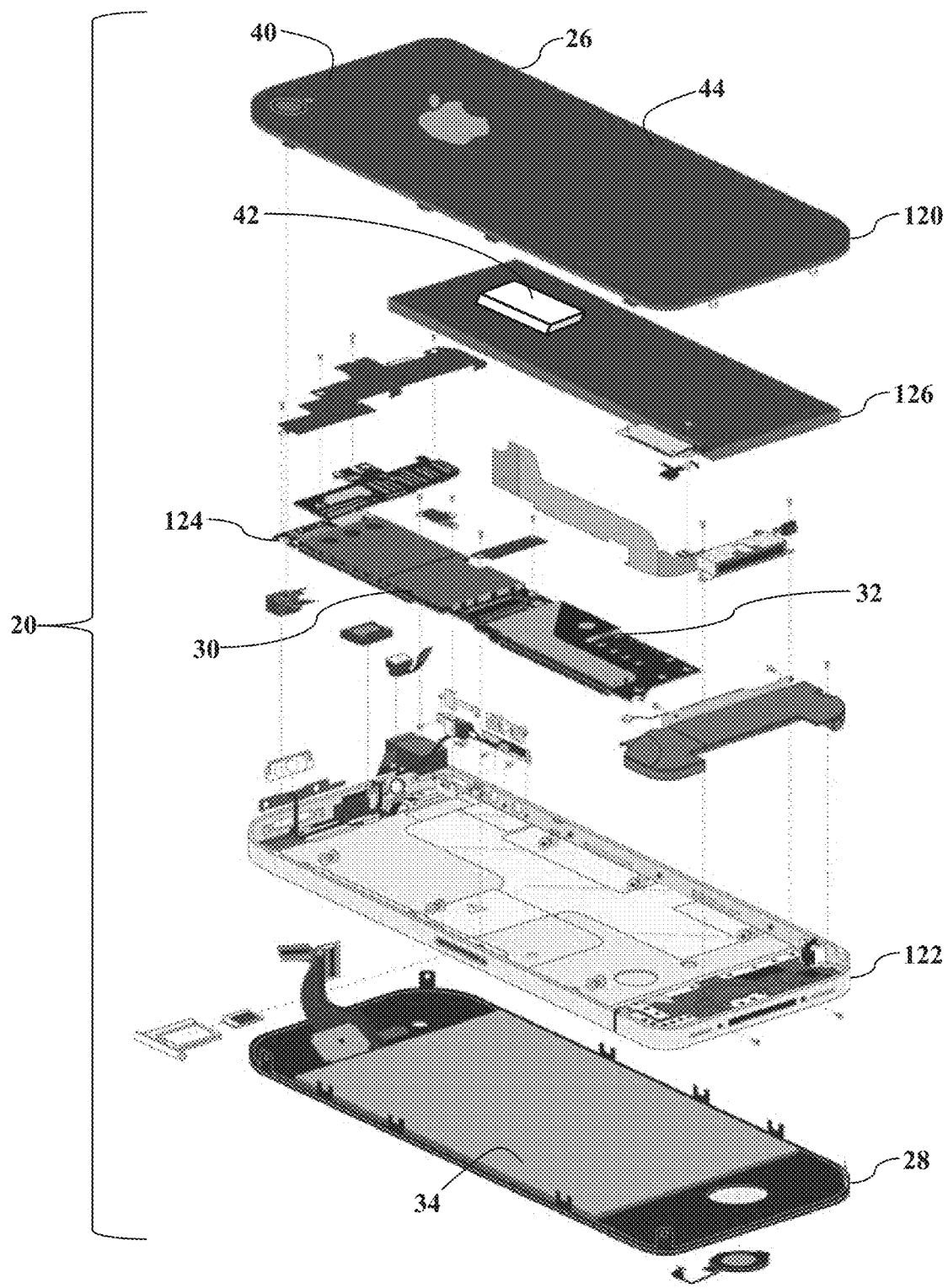
FIG. 15 is an exploded component view of an electronic device, according to exemplary embodiments.

FIG. 15 is an exploded component view of the electronic device 20, according to exemplary embodiments. The electronic device 20 is illustrated as the popular IPHONE® manufactured by Apple, Inc. The body 26 may have multiple parts or components, such as a bottom portion 120 mating with a central portion 122. The display device 28 and the touch sensor 34 are illustrated as an assembled module that covers the central portion 122. The body 26 houses a circuit board 124 having the processor 30, the memory 32, and many other components. A battery 126 provides electrical power. FIG. 15 illustrates the gesture detector 42 integrated into the assembly, proximate the bottom portion 120 of the body 26. This location may be advantageous for sensing vibration caused by gestures drawn on the outer surface 44. The gesture detector 42 may have an interface to the circuit board 124, such as a metallic strip or contact pad that conducts signals to/from the circuit board 124. The interface may also be a physical cable that plugs into a socket in the circuit board 124. Whatever the interface, the gesture detector 42 senses the vibration and/or the electrical charge (referred to above, and illustrated, as reference numerals 72 and 80) caused by gesture inputs on the body 26. The gesture detector 42 produces the output signal (referred to above, and illustrated, as reference numeral 52) in response to the vibration 72. The processor 30 analyzes the output signal 52 and executes the corresponding command 58, as earlier paragraphs explained.

The body 26 may have any design and construction. The body 26, for example, may have a two-piece clamshell design with mating upper and lower halves. The body 26, however, may have any number of mating components that protect the internal circuit board 124. The body 26 may have a rectangular access opening through which the display device 28 and the touch sensor 34 insert or protrude. The body 26, in other words, may have an inner rectangular edge or wall that frames the display device 28 and/or the touch sensor 34. The body 26 may be made of any material, such as metal, plastic, or wood.

Exemplary embodiments thus transform the backside 40. Conventional smartphones fail to utilize the backside 40 for gesture inputs. Exemplary embodiments, in contradistinction, transform the outer surface 44 of the backside 40 into the supplemental surface area for gesture detection. Whatever the shape or size of the outer surface 44 of the body 26, gestures may be input to execute the corresponding command 58, as earlier paragraphs explained. While the gesture detector 42 may be disposed anywhere within the electronic device 20, the gesture detector 42 is preferable proximate the supplemental gesture surface area. While the gesture detector 42 may be adhered to the outer surface 44 of the body 26, the gesture detector 42 may be preferably adhered to an inner surface of the bottom portion 120 of the body 26 for added protection from physical damage. A glue or adhesive may simply and quickly adhere the gesture detector 42 to the body 26. While any adhesive compound may be used, the adhesive may be chosen to minimize attenuation as the vibration 72 travels through the adhesive. However, the gesture detector 42 may alternatively be mechanically adhered, such as by fastener or weld. The gesture detector 42 may be soldered or welded to the body 26, especially when the body 26 is constructed of aluminum, magnesium, stainless steel, or any other metal. The gesture detector 42 may be soldered, TIG welded, or MIG welded to the body 26. Indeed, the body 26, and the supplemental gesture surface area 92, may be constructed of plastic, metal, wood, and/or any other material.

Figure 16:
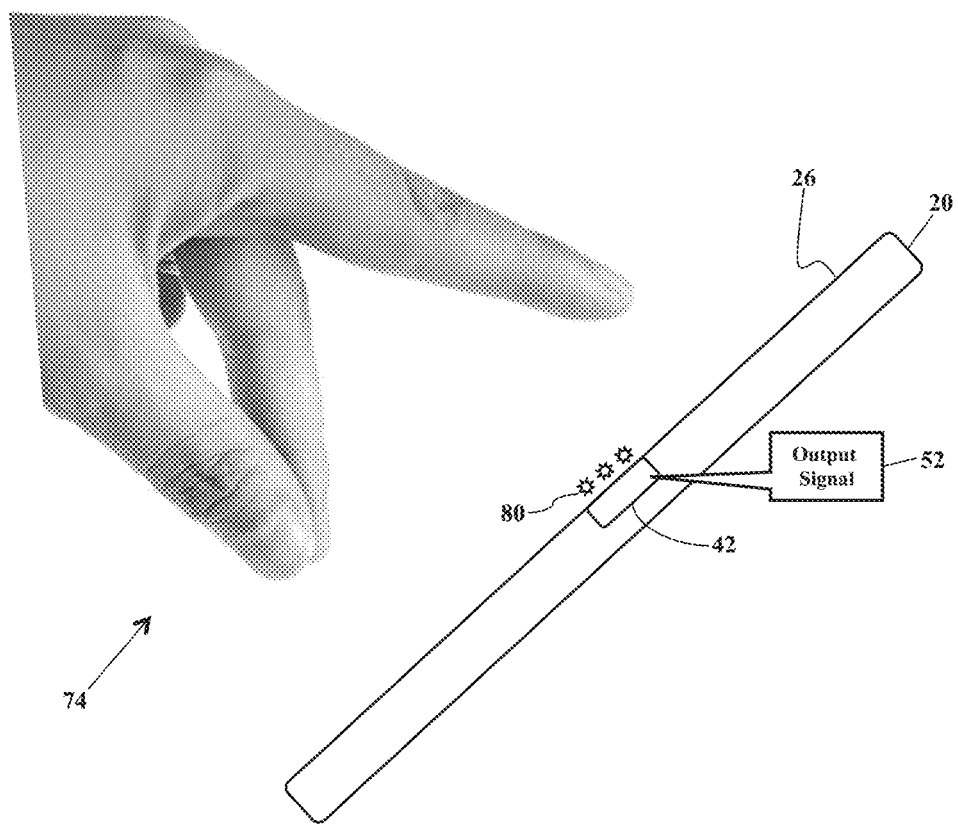
FIG. 16 is a schematic illustrating contactless, three-dimensional gestures, according to exemplary embodiments.

FIG. 16 is a schematic illustrating contactless, three-dimensional gestures, according to exemplary embodiments. FIG. 16 again illustrates the user's fingers performing some gesture 74. Here, though, the user's fingers need not contact the body 26. That is, the user may make the three-dimensional gesture 74 in the vicinity of the gesture detector 42. The three-dimensional gesture 74 may have motions or movements that do not come into contact with the body 26 of the electrical device 20. When the user's fingers perform the gesture 74, the gesture movements may cause air molecules to vibrate. The gesture detector 42 senses the vibrating air molecules and generates its output signal 52. Moreover, the user's contactless gesture movements may also induce the electrical charges 80 in the air to build on the body 26, thus also causing the gesture detector 42 to produce the output signal 52 (as explained with reference to FIGS. 5-7). Exemplary embodiments may thus respond to both two-dimensional gestures drawn on the body 26 and to three-dimensional gestures having contactless movements.

Figure 17:
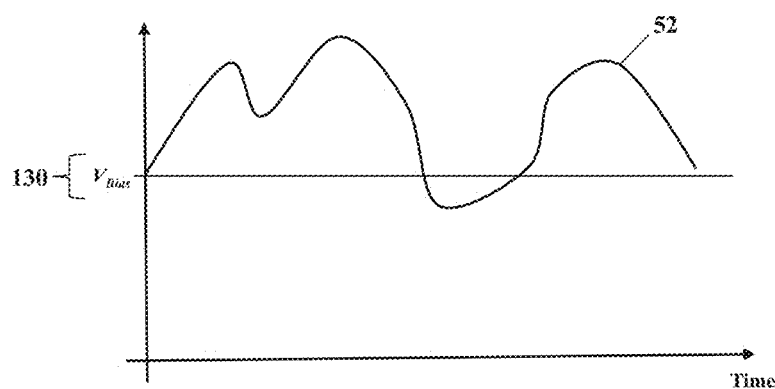
FIG. 17-19 are schematics illustrating output sampling, according to exemplary embodiments.
Figure 18:
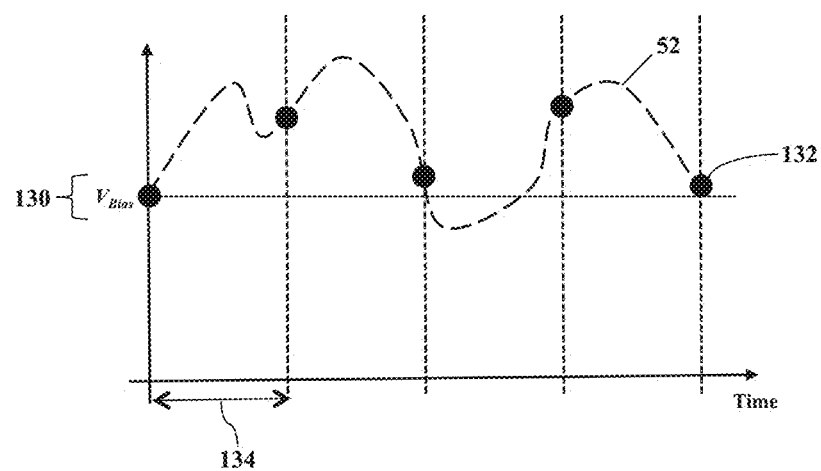
Figure 19:
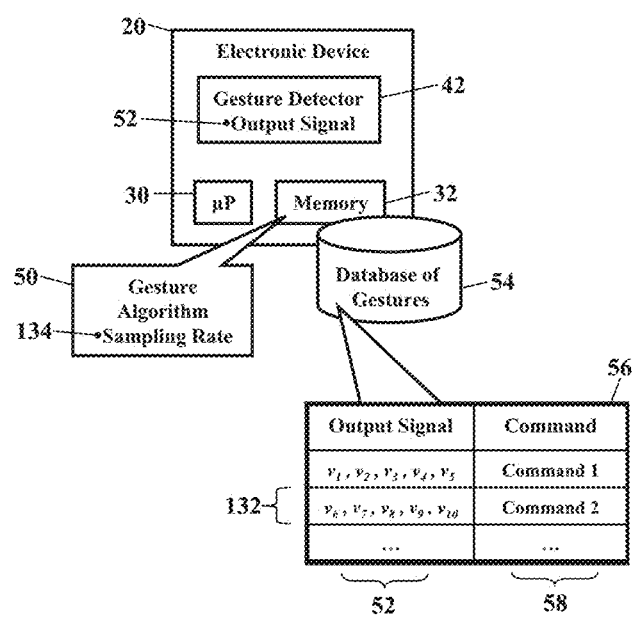

FIG. 17-19 are schematics illustrating output sampling, according to exemplary embodiments. Whatever gesture the user performs, the gesture detector (illustrated as reference numeral 42 in FIG. 16) generates the output signal 52. The output signal 52 may be voltage or charge (current), depending on the circuit design (as explained with reference to FIGS. 4-7). Regardless, the output signal 52 may have too much data for fast processing. For example, FIG. 17 illustrates a graph of the output signal 52 for an exemplary gesture having a one second (1 sec.) duration. The output signal 52 is illustrated as being biased about a biasing voltage $V_B$ (illustrated as reference numeral 130). Even though the gesture is only one second in duration, the output signal 52 may still contain too much data for quick processing. The processor 30, in other words, may require more time that desired to process the output signal 52.

FIG. 18 illustrates sampling of the output signal 52. Exemplary embodiments may sample the output signal 52 to produce discrete data points 132 according to some sampling rate 134. For mathematical simplicity, the sampling rate 134 is assumed to be 0.2 seconds, which may be adequate for human gestures. So, when the user performs the gesture having the one second duration, the output signal 52 may be sampled every 0.2 seconds to yield five (5) data points 132.

FIG. 19 again illustrates the database 54 of gestures. Because the output signal 52 may be sampled, the database 54 of gestures need only store the discrete data points 132 sampled from the output signal 52. FIG. 19 thus illustrates each sampled output signal 52 as a collection or set of the discrete data points 132 for each output signal 52. When the database 54 of gestures is queried, exemplary embodiments need only match the sampled values and not an entire, continuous voltage, charge, or current signal. The burden on the processor 30 is thus reduced, yielding a quicker response to the user's gesture input.

Figure 20A:
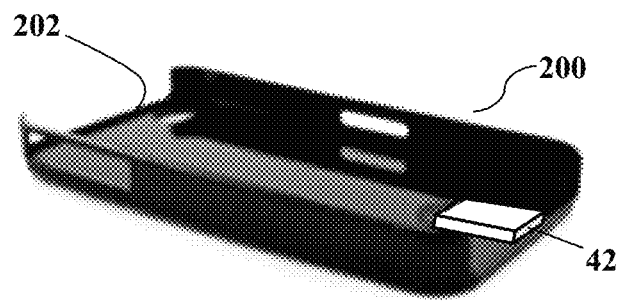
FIGS. 20A and 20B are schematics illustrating a protective case, according to exemplary embodiments.
Figure 20B:
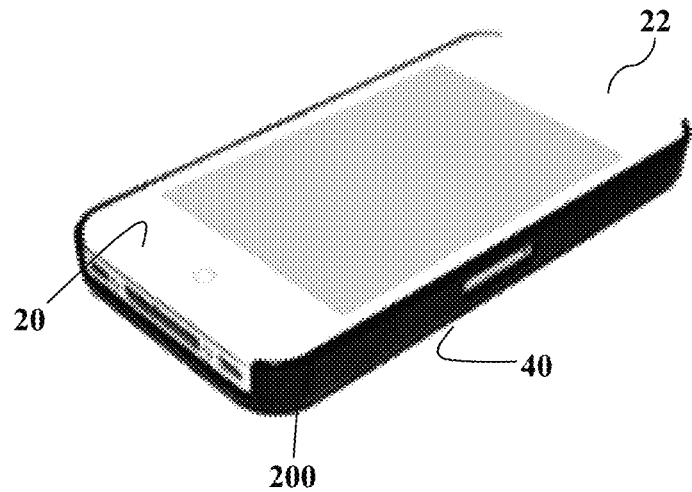

FIGS. 20A and 20B are schematics illustrating a protective case 200, according to exemplary embodiments. As many readers understand, many users of smartphones, tablet computers, and other mobile devices purchase the protective case 200. The protective case 200 protects the electronic device 20 (such as the smartphone 22) from damage. However, the protective case 200 may also deaden or insulate the backside 40 from the user's gesture inputs.

FIG. 20A thus illustrates the gesture detector 42. Because the protective case 200 may limit access to the backside 40 of the electronic device 20, the gesture detector 42 may be added to the protective case 200. FIG. 20A, for example, illustrates the gesture detector 42 adhered to an inner surface 202 of the protective case 200. The user may thus make gestures on or near the protective case 200, and the gesture detector 42 may still sense vibration and electrical charge (as explained above). The gesture detector 42 may still have the interface to the circuit board of the electronic device 20, again such as a metallic contact or socket.

Exemplary embodiments may be applied to the automotive environment. An interior of a car or truck, for example, has many surfaces for mounting the gesture detector 42. A center console, for example, may have a dedicated gesture surface for sensing the driver's gesture inputs. One or more of the piezoelectric transducers 70 may be affixed, mounted, or integrated into the gesture surface for sensing touch and other gesture-based inputs. An armrest and/or a steering wheel may also have an integrated gesture surface for sensing gesture inputs. As the driver (or passenger) gestures on or near the gesture surface, the piezoelectric transducer 70 senses the vibration 72 or the electric charge 80, as earlier paragraphs explained. Because the piezoelectric transducer 70 senses vibration and electrical charge, the gesture detector 42 may be integrated into any surface of any material.

Exemplary embodiments may also be applied to jewelry and other adornment. As wearable devices become common, jewelry will evolve as a computing platform. An article of jewelry, for example, may be instrumented with the piezoelectric transducer 70, thus enabling inputs across a surface of the jewelry. Moreover, as the piezoelectric transducer 70 may be small and adhesively adhered, exemplary embodiments may be applied or retrofitted to heirloom pieces and other existing jewelry, thus transforming older adornment to modern, digital usage.

Figure 21:
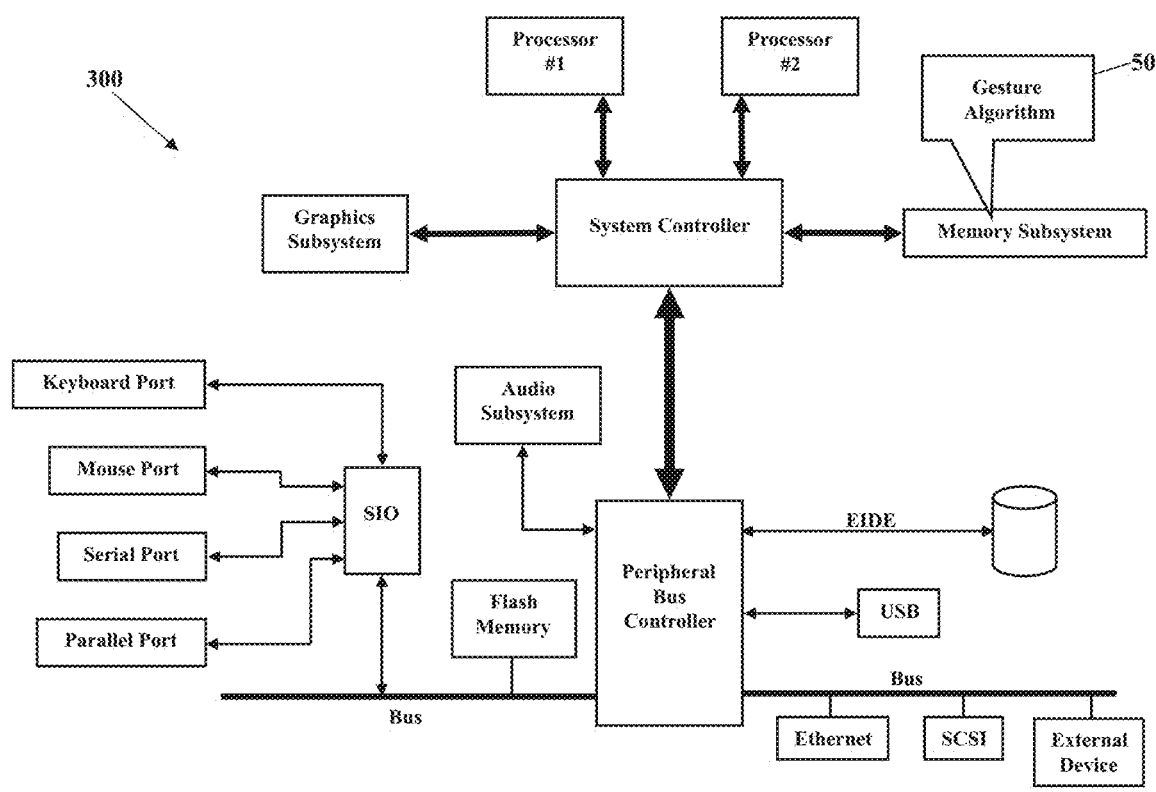
FIGS. 21-22 are schematics illustrating other operating environments for additional aspects of the exemplary embodiments.

FIG. 21 is a schematic illustrating still more exemplary embodiments. FIG. 21 is a generic block diagram illustrating the gesture algorithm 50 operating within a processor-controlled device 300. As the above paragraphs explained, the gesture algorithm 50 may operate in any processor-controlled device 300. FIG. 21, then, illustrates the gesture algorithm 50 stored in a memory subsystem of the processor-controlled device 300. One or more processors communicate with the memory subsystem and execute the gesture algorithm 50. Because the processor-controlled device 300 illustrated in FIG. 21 is well-known to those of ordinary skill in the art, no detailed explanation is needed.

Figure 22:
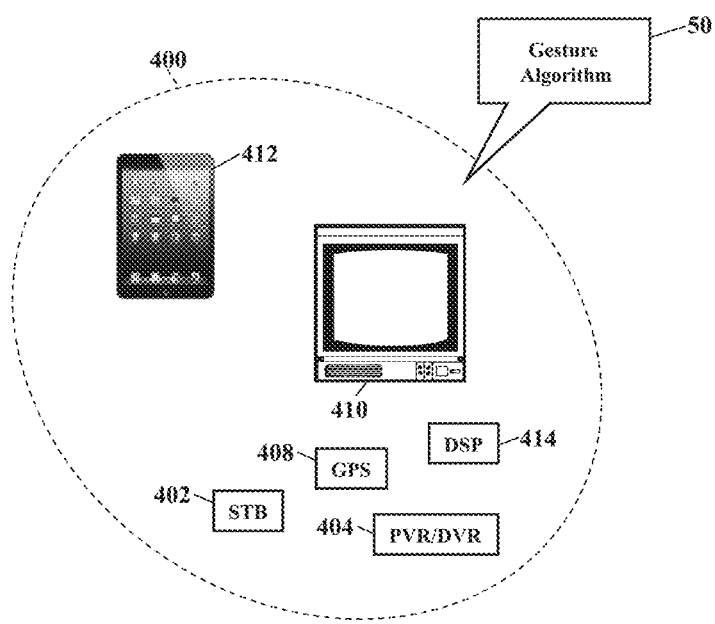

FIG. 22 depicts other possible operating environments for additional aspects of the exemplary embodiments. FIG. 22 illustrates the gesture algorithm 50 operating within various other devices 400. FIG. 22, for example, illustrates that the gesture algorithm 50 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 50 and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for detecting gestures, as explained above.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for gesture detection utilizing a protective case for housing an electronic device having at least a body with a front side and a back side, the protective case having an inner surface and an outer surface such that the inner surface of the protective case is aligned along the back side of the electronic device, the method comprising:
   detecting, by a gesture detector affixed to the inner surface of the protective case, a vibration propagating in the body of the electronic device caused by a contactless gesture input near the protective case, the protective case being an independent body from the body of the electronic device and separable from the electronic device;
   generating, by the gesture detector, a first output in response to the vibration propagating in the body of the electronic device caused by the contactless gesture input near the protective case;
   detecting, by the gesture detector, an electrical charge on the body of the electronic device caused by the contactless gesture input near the protective case;
   generating, by the gesture detector, a second output in response to the electrical charge on the body of the electronic device caused by the contactless gesture input near the protective case;
   receiving a contact gesture input via a supplemental gesture surface on the outer surface of the protective case;
   processing a signal converted from the first output and the second output generated by the gesture detector in response to the vibration propagating in the body of the electronic device and the electrical charge on the body of the electronic device caused by the contactless gesture input near the protective case;
   sampling the signal to produce a plurality of sampled signal data points, wherein the plurality of sampled signal data points are discrete data points for the signal produced at a sampling rate;
   querying a database for one or more of the plurality of sampled signal data points, the database associating the one or more of the plurality of sampled signal data points with a command;
   retrieving the command that is associated with the one or more of the plurality of sampled signal data points; and
   executing the command in response to the contactless gesture input near the protective case.

2. The method of claim 1 wherein the gesture detector is a piezoelectric transducer.

3. The method of claim 2, further comprising:
   connecting the piezoelectric transducer to a circuit board of the electronic device.

4. The method of claim 1 further comprising:
   affixing the protective case to the electronic device.

5. A protective case for protecting an electronic device, the electronic device having at least a body with a front side and a back side, the protective case comprising:
   an inner and outer surface such that the inner surface of the protective case is aligned along the back side of the body of the electronic device, the protective case being an independent body from the body of the electronic device and separable from the electronic device; and
   a supplemental gesture surface on the outer surface of the protective case for receiving contact gesture input;
   a gesture detector adhered to the inner surface of the protective case for sensing a vibration propagating in the electronic device and sensing an electrical charge on the body of the electronic device caused by a contactless gesture input near the protective case, and causing the electronic device to:
      generating, by the gesture detector, a first output in response to the vibration propagating in the electronic device caused by the contactless gesture input near the protective case;
      generating, by the gesture detector, a second output in response to the electrical charge on the body of the electronic device caused by the contactless gesture input near the protective case;
      convert a signal from the first output and the second output generated by the gesture detector in response to the vibration propagating in the body and the electrical charge on the body of the electronic device caused by the contactless gesture input near the protective case;
      produce a plurality of sampled signal data points by sampling the signal, wherein the plurality of sampled signal data points are discrete data points for the signal produced at a sampling rate;
      query a database for one or more of the plurality of sampled signal data points, the database associating the one or more of the plurality of sampled signal data points with a command;
      retrieve the command associated with the one or more of the plurality of sampled signal data points converted from the output generated by the gesture detector is retrieved; and
      execute the command in response to the contactless gesture.

6. The protective case of claim 5, wherein the gesture detector is a piezoelectric transducer that uses a piezoelectric effect to generate the first output and the second output.

7. The protective case of claim 6 wherein the electronic device receives a voltage signal generated by the piezoelectric transducer.

8. The protective case of claim 6, wherein the piezoelectric transducer produces a charge signal in response to the vibration propagating in the body of the electronic device.

9. The protective case of claim 6, wherein the electronic device comprises a processor and a memory storing instructions that when executed by the processor cause the processor to perform a plurality of operations that cause, by the electronic device, the convert the signal, the produce the plurality of sampled signal data points by sampling the signal, the query the database, the retrieve the command associated with the one or more of the plurality of sampled signal data points converted from the output generated by the gesture detector is retrieved, and the execute the command in response to the contactless gesture.

10. The protective case of claim 5, wherein the protective case and the electronic device are rigidly connected.

11. The protective case of claim 5, wherein the electronic device is a smartphone.

12. An electronic device comprising:
a body having a front side and a back side;
a processor housed within the body;
a display device exposed by the front side of the body, the display device interfacing with the processor and responsive to gesture inputs;
a touch sensor exposed by the front side of the body, the touch sensor oriented above the display device, the touch sensor interfacing with the processor and responsive to a first gesture detected by the touch sensor;
a protective case having an inner and outer surface;
a supplemental gesture surface area located on the outer surface of the protective case for receiving contact gesture input; and
a gesture detector adhered to the inner surface of the protective case for generating a first output in response to a vibration propagating in the body and a second output in response to an electrical charge on the body in response to a second gesture near the protective case, the second gesture being a contactless gesture, the protective case being an independent body from the body of the electronic device and separable from the electronic device; and
a memory housed within the body, the memory storing instructions that when executed cause the processor to perform operations, the operations comprising:
generating, by the gesture detector, the first output in response to the vibration propagating in the body of the electronic device caused by the contactless gesture input near the protective case;
generating, by the gesture detector, the second output in response to the electrical charge on the body of the electronic device caused by the contactless gesture input near the protective case;
receiving a signal converted from the first output and the second output generated by the gesture detector;
sampling the signal to produce a plurality of sampled signal data points, wherein the plurality of sampled signal data points are discrete data points for the signal produced at a sampling rate;
querying a database for one or more of the plurality of sampled signal data points, the database associating the one or more of the plurality of sampled signal data points with a command;
retrieving the command that is associated with the one or more of the plurality of sampled signal data points; and
executing the command in response to the second gesture near the protective case.

13. The electronic device of claim 12 wherein the gesture detector is a piezoelectric transducer.

14. The electronic device of claim 12, wherein the electronic device is a smartphone.

15. The electronic device of claim 12, wherein the electronic device and the protective case are rigidly connected.

* * * * *